United States Patent [19]

Wolicki

[11] 3,969,032
[45] July 13, 1976

[54] ROD SPLICE

[75] Inventor: Richard J. Wolicki, Buffalo, N.Y.

[73] Assignee: Buffalo Brake Beam Company, Lackawanna, N.Y.

[22] Filed: Apr. 7, 1975

[21] Appl. No.: 565,521

[52] U.S. Cl. ............................... 403/310; 403/271; 52/758 B; 52/726
[51] Int. Cl.² ...................... F16B 2/02; F16B 7/04; F16D 1/00; F16D 1/02
[58] Field of Search ........... 403/270, 271, 272, 309, 403/310, 311; 52/514, 726, 758 B

[56] References Cited
UNITED STATES PATENTS

| | | | |
|---|---|---|---|
| 1,656,797 | 1/1928 | Scott | 403/272 X |
| 1,936,498 | 11/1933 | Corbett | 52/758 B UX |
| 1,982,183 | 11/1934 | Tarbox | 403/331 |
| 3,791,751 | 2/1974 | Vey | 403/311 |

Primary Examiner—Werner H. Schroeder
Assistant Examiner—Wayne L. Shedd
Attorney, Agent, or Firm—Christel & Bean

[57] ABSTRACT

A rod repair splice having a pair of trough shaped bodies each with a rod embracing arcuate flange at one end thereof. The bodies are diametrically mounted on the rod to be repaired with the respective arcuate flanges thereof disposed at longitudinally opposite ends of the splice. Each of the bodies is welded along their opposite longitudinal side edges to the peripheral surface of the rod sections. Each axial end portion of the bodies includes three distinct camming surfaces which slope from the inner surface of the body adjacent to the rod to be spliced to the outer surface of the body. The sloping surfaces thereby avoid shoulders which might cause hangup upon axial movement of the repaired rod by camming an axial interference in a radially outward direction out of axial contact with the splice.

5 Claims, 9 Drawing Figures

U.S. Patent  July 13, 1976  3,969,032
Fig. 1.
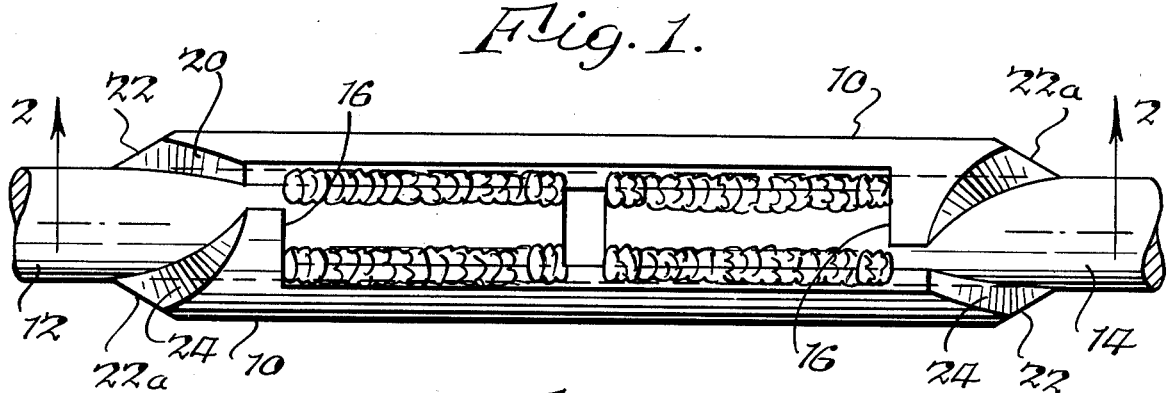
Fig. 2.
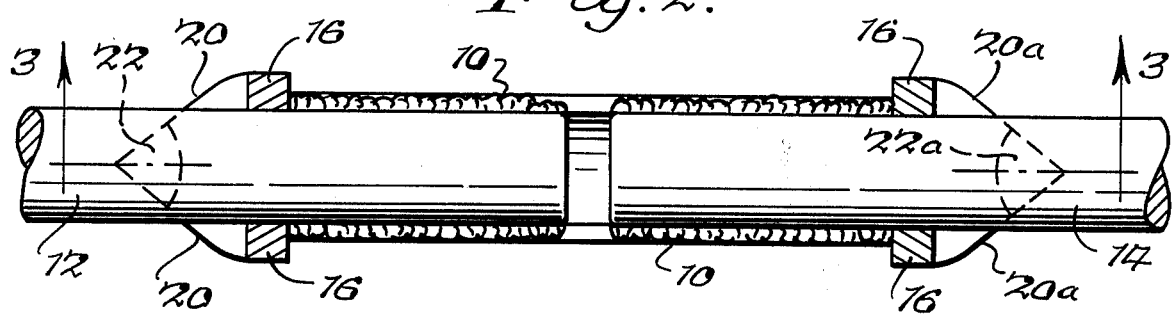
Fig. 3.
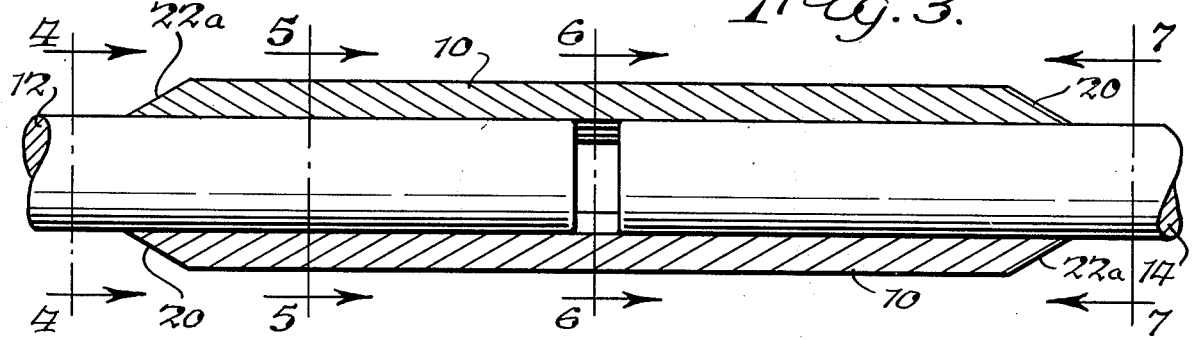
Fig. 4. 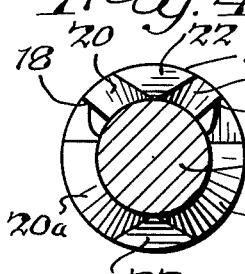  Fig. 5. 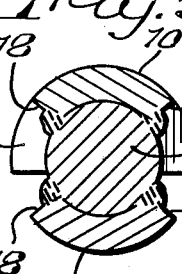  Fig. 6. 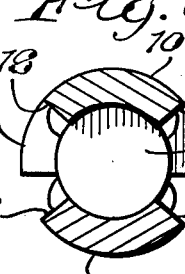  Fig. 7. 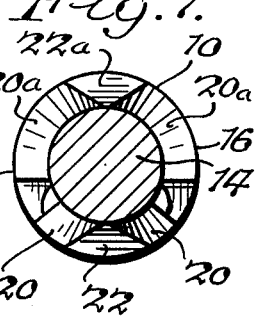
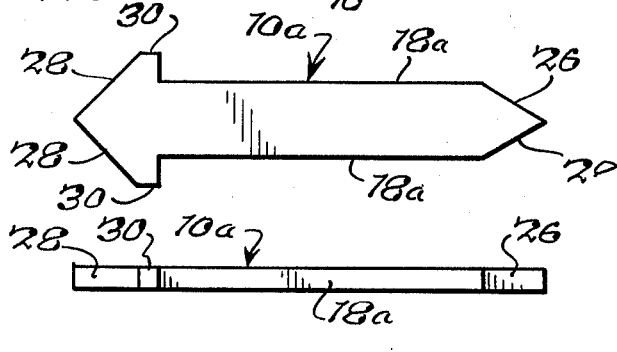
Fig. 8.
Fig. 9.

ROD SPLICE

BACKGROUND OF THE INVENTION

This invention relates to the splicing art and, more particularly, to a splice for repairing rods and the like. More specifically, the present invention provides an improved rod splice wherein sloped camming surfaces are formed on the axial end portions of the splice to avoid shoulders which might cause hang-up upon axial movement of the repaired rods.

Actuating metallic pull rods, such as those utilized for connecting linkages or railroad car brake rigging systems, for example, are sometimes fractured, damaged or become worn or otherwise weakened somewhere along the lines thereof and must be either replaced or repaired. If repaired, the damaged or worn portion of the rod is removed and a splice is effected between the adjacent ends of the severed rod portions. Sometimes, the splice is effected by substituting a length of rod for the damaged portion and welding such separate piece at its ends. Often, the splice merely consists of a piece of tubing slip fitted over the adjacent ends of a severed rod and peripherally welding its opposite ends to the rod sections.

One of the critical problems encountered in repairing railroad car brake rigging systems is the potential for axial hang-up of a repaired rod by interference with shoulders created by a splice on a rod. Therefore, potential axial hang-up of a spliced rod constituting part of a railroad brake system is of paramount concern. However, the present invention is applicable to any rod splicing situation in which the repaired rod must be free to move in an axial direction.

The prior art has considered utilization of body members similar to those in the present invention which are diametrically disposed on adjacent rod sections to be spliced and are welded thereto. Such a prior art structure is found in U.S. Pat. No. 3,791,751 issued to Robert E. Vey and assigned to the assignee of the present invention. However, the diametrically disposed body members disposed in the aforesaid Vey patent include axial end faces which are substantially perpendicular to the longitudinal axis of the rod portions to be spliced and thereby create axial shoulders adjacent to the outer surfaces of the rod sections. The existence of such shoulders creates the potential problem of the repaired rod becoming hung-up upon axial movement.

SUMMARY OF THE INVENTION

Accordingly, one object of the present invention is to provide a new and improved rod repair splice which avoids having shoulders on the axial end portions of the splice which might cause hang-up upon axial movement of the repaired rod.

Another object of the present invention is to provide an improved rod repair splice which is strong and rigid in construction, durable and self-locating in use, relatively low in cost and which can be expeditiously effected in the field.

A further object of the present invention is to provide the aforesaid rod repair splice which can be formed or manufactured with a minimum number of manufacturing operations.

In summary, the present invention provides a rod repair splice having two substantially identical body members diametrically mounted on adjacent rod portions to be spliced. Each body member is trough-shaped in cross section for fitting partially about the periphery of the rod sections and further includes on one end portion an arcuate flange laterally extending beyond the longitudinal edge portions thereof. Each arcuate flange extends more than 180° for snapping onto the rod to be spliced. The two flanges of the pair of body members utilized in a splice are disposed at opposite ends thereof. Each end portion of each body member further includes three sloped, camming surfaces which extend from the inner to the outer surface of each respective body member. In this manner, any interference is cammed radially outward upon axial movement of the repaired rod and engagement of such interference with either end of the splice.

The foregoing and other objects, advantages and characterizing features of the present invention will become clearly apparent from the ensuing detailed description of an illustrative embodiment thereof, taken together with the accompanying drawings wherein like reference characters denote like parts throughout the various views.

BRIEF DESCRIPTION OF THE DRAWING FIGURES

FIG. 1 is a view in side elevation of a rod repair splice of this invention, the ends of the spliced rod sections being broken away for convenience in illustration;

FIG. 2 is a view thereof partly in longitudinal section and partly in elevation, taken about on line 2—2 of FIG. 1;

FIG. 3 is a view thereof partly in longitudinal section and partly in elevation, taken about on line 3—3 of FIG. 2;

FIGS. 4, 5, 6 and 7 are transverse sectional views taken about on lines 4—4, 5—5, 6—6, and 7—7, respectively, of FIG. 3;

FIG. 8 is a plan view of the blank from which the repair splice member is formed; and FIG. 9 is a side elevational view of such blank.

DETAILED DESCRIPTION OF A PREFERRED EMBODIMENT

Referring now in detail to the illustrative embodiment depicted in the accompanying drawings, there is shown in FIG. 1 a rod repair splice generally including a pair of body members indicated as 10. Body members 10 are diametrically mounted on rod portions 12 and 14 for purposes of splicing such rod sections together. As viewed in FIGS. 1, 4 and 7 together, each of the body members 10 is generally trough shaped in transverse cross section and fits partially about the periphery of the rod section to be spliced. Each of the body members further includes opposite end portions with one end portion of each body member including an arcuate flange 16 which extends through an arc greater than that of the longitudinally extending side edge portion 18 of each body member.

Each end portion of each body member 10 further includes three sloping surfaces. Three sloping surfaces on the top body member shown in FIG. 1 on the end portion thereof not having an arcuate flange are slightly different than the other end portion of the top body member 10 because of the inclusion of arcuate flange 16. As shown in FIG. 2 of the drawings, each end portion respectively includes a central sloping portion 22 and 22a and longitudinally receding, laterally extending sloping portions respectively designated as 20, 24 and 20a and 24a. The sloping portions or camming surfaces 20, 24, 20a and 24a slope from the inner radial surface of the body member to the outer radial surface thereof and are shaped during formation of the body member as will be more fully described hereinbelow. Each centrally sloping portion 22 and 22a in turn intersect their respectively adjacent sloping portions and likewise slope from the inner radial surface to the outer radial surface of the body member.

Since the body members 10 are substantially identical with their respective arcuate flanges disposed at opposite ends of the splice and complementing one another therefore, their assembled arrangements can be more fully appreciated through FIGS. 4, 5, 6 and 7. As shown in FIG. 4, the top body member 10 does not include a flanged end portion and the longitudinal side edges 18 seen in such transverse cross section extend through an arc of less than 180°. In contrast, the end portion of the lower body member 10 includes an arcuate flange which extends through an arc of more than 180°. In addition it can be seen that the exposed surface area of sloping portions 20a and 24a are considerably greater than those corresponding portions on the non-flanged end portion of a body member.

FIGS. 5 and 6 show in section and in elevation respectively the placement of weldment between the longitudinal side edge portions 18 of the body members and the adjacent rod portions 12 and 14, respectively. FIG. 7 gives a similar view as shown in FIG. 4 but of the opposite end of the splice taken about on line 7—7 of FIG. 3. As shown therein, the upper body member 10 includes an end portion having an arcuate flange with corresponding sloped portions or camming surfaces 20a, 22a and 24a.

Each body member 10 is formed from a planar blank 10a as shown in FIG. 8. In plan view, the 10a blank has generally parallel opposite side edge portions 18a. In addition, each end portion of the blank includes end edges 26 and 28 extending from respectively adjacent side edges. Each pair of end edges extend towards one another and form respective points of intersection. Furthermore, one of the end portions includes lateral projections 30 from which end edges 28 extend. Lateral projections 30 provide for the arcuate flange of the body member. As seen in FIG. 9 of the drawings, the planar blank 10a as viewed in side elevation is of uniform thickness with the side faces thereof being substantially perpendicular to the plane of the plan view shown in FIG. 8.

The body member 10 is created by forming the blank 10a partially about a cylindrical surface along a longitudinal axis passing through the points of intersection of the respective pairs of end edges 26 and 28. Upon such forming of the planar blank, the projections 30 extend through an arc of more than 180° and the arc delimited by the side edge portions 18 is less than 180°.

The end edges 26 and 28 deform upon such bending to provide the sloping camming surfaces previously described as 20, 24 20a and 24a, respectively. Upon completion of such bending about a cylindrical surface, the points of intersection of each deformed planar blank result in a radially extending shoulder. In order to provide the desired axial camming surfaces 22 and 22a, the axial end faces created at the respective points of intersection of the deformed blank are machined in order to form the sloping cam surfaces 22 and 22a.

In utilizing the rod repair splice of the present invention, each pair of identical body members are mounted diametrically opposite to one another on a rod to be spliced. In this manner, each arcuate flange of more than 180° is snapped over the rod while the remaining portion of each body member being less than 180° in arc simply rests on the rod. As shown in FIG. 1 and FIGS. 5 and 6, each body member is welded to the rod to be spliced in four locations.

From the foregoing, it is apparent that the objects of the present invention have been fully accomplished. As a result of this invention, an improved rod repair splice is provided having sloped camming surfaces at both ends thereof for avoiding shoulders which might cause hang-up upon axial movement of the repaired rod.

I claim:

1. A rod repair splice means for repairing a rod to be spliced, said repair splice comprising:
   a pair of body members, each said body member being of generally trough shaped cross section for fitting partially about the periphery of the rod to be spliced;
   each of said body members having opposite, longitudinally extending side edge portions and opposite end portions and at least one arcuate flange adjacent to at least one end thereof and extending laterally beyond one of said side edge portions thereof; said members being mounted diametrically opposite to each other on the rod to be spliced with said flange of each member at opposite ends of the splice; and said side edge portions of said body members being adapted to be welded to the rod to be spliced and at least one pair of diametrically opposite end portions of said members sloping toward the rod in a manner avoiding shoulders which might cause hang-up upon axial movement of the repaired rod wherein each of said pair of diametrically opposite end portions includes a central sloping portion extending from the outer surface of said respective body member to the inner surface thereof and longitudinally receding, laterally extending sloping portions on opposite sides of said central portion and also extending from the outer surface of said respective body member to the inner surface thereof, said latter portions intersecting said central portion to form a plurality of distinct camming surfaces.

2. A rod repair splice means as set forth in claim 1, wherein each of said body members has a pair of said arcuate flanges extending beyond said opposite side edge portions adjacent to said one end thereof.

3. A rod repair splice means as set forth in claim 2, wherein the troughs of said body members extend through an arc of less than 180°, and said flanges further extend said arc to greater than 180°.

4. A rod repair splice means as set forth in claim 3, wherein said body members are substantially identical and wherein said flanges are on the same radius as the remainder of said body members.

5. A rod repair splice means as set forth in claim 1, wherein said opposite end portions each come to a point.

* * * * *